United States Patent
Sato

(10) Patent No.: US 10,183,545 B2
(45) Date of Patent: Jan. 22, 2019

(54) AIR CONDITIONING DEVICE

(71) Applicant: DENSO CORPORATION, Kariya, Aichi-pref. (JP)

(72) Inventor: Hiroyuki Sato, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 163 days.

(21) Appl. No.: 15/030,458

(22) PCT Filed: Sep. 16, 2014

(86) PCT No.: PCT/JP2014/004751
§ 371 (c)(1),
(2) Date: Apr. 19, 2016

(87) PCT Pub. No.: WO2015/059865
PCT Pub. Date: Apr. 30, 2015

(65) Prior Publication Data
US 2016/0263963 A1    Sep. 15, 2016

(30) Foreign Application Priority Data

Oct. 24, 2013  (JP) .................................. 2013-221052

(51) Int. Cl.
| | |
|---|---|
| *B60H 1/00* | (2006.01) |
| *F24F 13/12* | (2006.01) |
| *F24F 13/10* | (2006.01) |
| *F24F 13/24* | (2006.01) |

(52) U.S. Cl.
CPC ......... *B60H 1/00692* (2013.01); *F24F 13/10* (2013.01); *F24F 13/12* (2013.01);
(Continued)

(58) Field of Classification Search
CPC .......... B60H 1/00692; B60H 2001/006; B60H 2001/00728; F24F 13/10; F24F 13/12; F24F 13/24
(Continued)

(56) References Cited

U.S. PATENT DOCUMENTS

| | | | |
|---|---|---|---|
| 6,224,480 B1 * | 5/2001 | Le ...................... | B60H 1/00692 454/156 |
| 6,347,988 B1 | 2/2002 | Kurokawa et al. | |

(Continued)

FOREIGN PATENT DOCUMENTS

| | | |
|---|---|---|
| EP | 1445133 A2 | 8/2004 |
| JP | 2001113937 A | 4/2001 |

(Continued)

OTHER PUBLICATIONS

International Search Report and Written Opinion (in Japanese with English Translation) for PCT/JP2014/004751, dated Dec. 22, 2014.

*Primary Examiner* — Gregory Huson
*Assistant Examiner* — Ryan Faulkner
(74) *Attorney, Agent, or Firm* — Harness, Dickey & Pierce, P.L.C.

(57) ABSTRACT

A sliding door has a door main body and door support sections supported by contact with an inner wall of a guide groove. The guide groove has a groove lacking section having a size that the door main body can be inserted therefrom. When a first one of the door support sections that is the closest to a tip end of the sliding door is located within the groove lacking section, another one of the door support sections that is located opposite from the tip end of the sliding door through the groove lacking section satisfies a relational expression of A≤90−0.2L, in which A represents a distance from the tip end to an end of the another one of the (Continued)

door support sections on a separated side away from the tip end, and L represents a door width of the door main body.

17 Claims, 11 Drawing Sheets

(52) U.S. Cl.
CPC ........ *F24F 13/24* (2013.01); *B60H 2001/006* (2013.01); *B60H 2001/00728* (2013.01)

(58) Field of Classification Search
USPC .......................................................... 454/160
See application file for complete search history.

(56) References Cited

U.S. PATENT DOCUMENTS

| 6,688,964 B2 * | 2/2004 | Uemura | ............. | B60H 1/00692 |
| | | | | 454/121 |
| 2012/0180393 A1 | 7/2012 | Suzuki | | |

FOREIGN PATENT DOCUMENTS

| JP | 2004098780 A | 4/2004 |
| JP | 2004237940 A | 8/2004 |
| JP | 3767060 B2 | 4/2006 |
| JP | 2009184495 A | 8/2009 |
| JP | 2009274708 A | 11/2009 |
| JP | 2010018248 A | 1/2010 |
| JP | 2012144214 A | 8/2012 |
| JP | 2013022997 A | 2/2013 |

\* cited by examiner

AIR CONDITIONING DEVICE

CROSS REFERENCE TO RELATED APPLICATIONS

This application is a U.S. National Phase Application under 35 U.S.C. 371 of International Application No. PCT/JP2014/004751 filed on Sep. 16, 2014 and published in Japanese as WO 2015/059865 A1 on Apr. 30, 2015. This application is based on and claims the benefit of priority from Japanese Patent Application No. 2013-221052 filed on Oct. 24, 2013. The entire disclosures of all of the above applications are incorporated herein by reference.

TECHNICAL FIELD

The present disclosure relates to an air conditioning device including a sliding door.

BACKGROUND ART

A structure of an air conditioning case for assembling a sliding door is described in PTL 1. In PTL 1, the air conditioning case can be divided into a first case section and a second case section by a dividing surface in the vicinity of the door. A guide groove and an insertion opening are provided in the first case section, and a lid member is provided in the second case section. The guide groove supports the door and guides movement of the door. In the first case section, the insertion opening is provided at an end of the guide groove in a door moving direction.

After the door is inserted from the insertion opening of the first case section, the insertion opening can be closed by the lid member by assembling the first and second case sections.

However, due to such a structure that the insertion opening is provided at the end of the guide groove in the first case section and that the insertion opening of the first case section is closed by the lid member of the second case section, the case dividing surface has to be formed in the vicinity of the door. For this reason, a layout of the air conditioning case is restricted, and a flexibility in design of the air conditioning case is low.

PRIOR ART LITERATURES

Patent Literature

PTL 1: JP 3767060 B2

SUMMARY OF INVENTION

The present disclosure has a purpose of providing an air conditioning device that has a high flexibility in design of an air conditioning case and that can restrict generation of abnormal rattling sound of a sliding door. More specifically, a first purpose thereof is to restrict the generation of the abnormal rattling sound when a door support section adjacent to a tip end of door is located in a groove lacking section. In addition, a second purpose thereof is to restrict the generation of the abnormal rattling sound when door support sections are located on both sides of the groove lacking section of a guide groove and when another door support section is located in the groove lacking section.

To attain the first purpose, in an air conditioning device, when a first one of door support sections that is the closest to a tip end of the sliding door in the door moving direction is located within the groove lacking section, another one of the door support sections that is located opposite from the tip end of the sliding door through the groove lacking section in the guide groove and that is the closest to the groove lacking section satisfies a relational expression of $A \leq 90-0.2L$, in which $A$ (unit: mm) represents a distance from the tip end of the sliding door to an end of the another one of the door support sections, which is the closest to the groove lacking section, on a separated side away from the tip end, and $L$ (unit: mm) represents a door width of the door main body.

In this way, the generation of the abnormal rattling sound can be restricted. Therefore, according to the present disclosure, the generation of the abnormal rattling sound, which is generated when the door support section adjacent to the tip of the door is located in the groove lacking section, can be restricted.

To attain the second purpose, in an air conditioning device, a relational expression of $D \leq 2(90-0.2L)$ is satisfied, in which $D$ (unit: mm) represents a distance between ends on separated sides from each other of two of the door support sections located the closest to the groove lacking section on sides that are one side in the door moving direction and the other side in the door moving direction of the groove lacking section in the guide groove, when another one of the door support sections is located within the groove lacking section, and $L$ (unit: mm) represents a door width of the door main body.

In this way, the generation of the abnormal rattling sound can be restricted. Therefore, according to the present disclosure, the generation of the abnormal rattling sound, which is generated when the door support sections are located on both sides of the groove lacking section of the guide groove and when the another door support section is located in the groove lacking section, can be restricted.

DESCRIPTION OF EMBODIMENTS

A description will hereinafter be made on embodiments of the present disclosure on the basis of the drawings. It should be noted that, in the following embodiments, components that are mutually the same or equivalent are denoted by the same reference signs for the description.

First Embodiment

An indoor unit of an air conditioner for a vehicle of this embodiment is arranged on a vehicle front side of an instrument panel (a dashboard) in a vehicle cabin.

Figure 1:
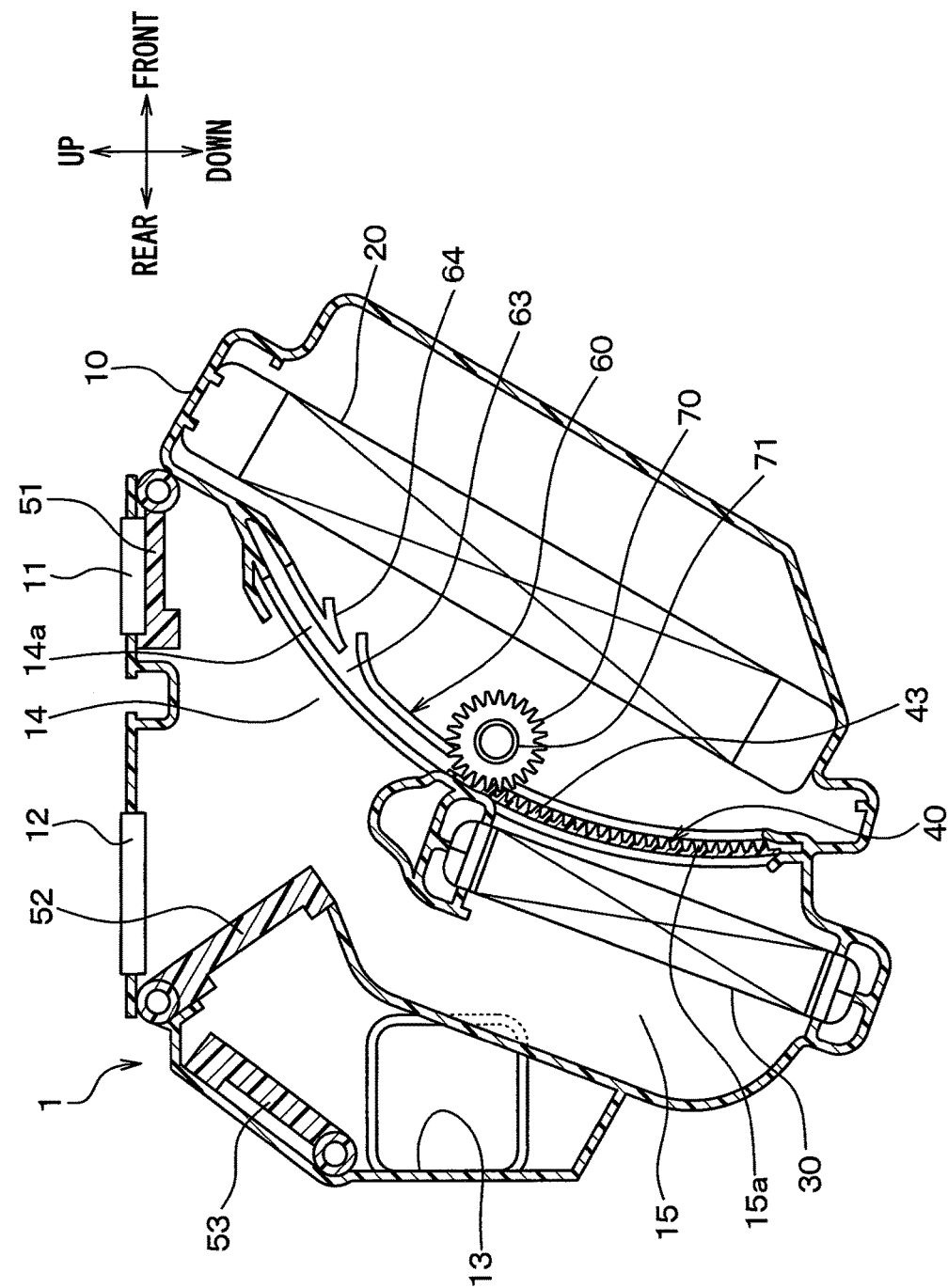
FIG. 1 is a cross-sectional view illustrating an indoor unit of an air conditioner for a vehicle in a first embodiment.

As depicted in FIG. 1, an indoor unit 1 includes an air conditioning case 10, an evaporator 20, a heater core 30, an air mix door 40, and mode doors 51, 52, 53. It should be noted that up, down, front, rear arrows in FIG. 1 indicate directions in a state where the indoor unit 1 is mounted in the vehicle.

The air conditioning case 10 defines an air passage through which blown air flows toward the vehicle cabin. The blown air is formed by a blower, which is not depicted. The air conditioning case 10 accommodates the evaporator 20, the heater core 30, the air mix door 40, and the mode doors 51, 52, 53. The air conditioning case 10 has a defroster opening 11, a face opening 12, and a foot opening 13 at the most downstream portion in the flow of air.

The defroster opening 11 continues with a defroster blowoff port, which is opened toward an inner surface of a front windshield, via an air conditioning duct. The blown air that has passed through the defroster opening 11 is blown from the defroster blowoff port. The face opening 12 continues with a face blowoff port, which is opened toward an upper half body of an occupant, via the air conditioning duct. The blown air that has passed through the face opening 12 is blown from the face blowoff port. The foot opening 13 continues with a foot blowoff port, which is opened toward a lower half body of the occupant, via the air conditioning duct. The blown air that has passed through the foot opening 13 is blown from the foot blowoff port.

The evaporator 20 is a component that constitutes a refrigeration cycle, and is a cooling heat exchanger for cooling the blown air by exchanging heat between the blown air and a refrigerant. The heater core 30 is a heating heat exchanger for heating the blown air by exchanging heat between a heat source, such as an engine coolant, and the blown air. The heater core 30 is arranged on a downstream side of the evaporator 20 in the flow of air and heats the blown air that has passed through the evaporator 20.

A cold wind passage 14, through which cold air that has passed through the evaporator 20 flows while bypassing the heater core 30, and a warm wind passage 15, through which warm air that has passed through the heater core 30 flows, are formed in the air conditioning case 10. In addition, in the air conditioning case 10, a first opening 14a, through which the air flowing toward the cold wind passage 14 passes, is formed on an upstream side of the cold wind passage 14 in the flow of air, and a second opening 15a, through which the air flowing toward the heater core 30 passes, is formed on an upstream side of the heater core 30 in the flow of air.

The air mix door 40 adjusts an air volume ratio of the cold wind flowing through the cold wind passage 14 and the warm wind flowing through the warm wind passage 15 by adjusting an opening area of the first opening 14a and an opening area of the second opening 15a. In this embodiment, the air mix door 40 is arranged on the downstream side of the evaporator 20 in the flow of air and on the upstream side of the cold wind passage 14 and the heater core 30 in the flow of air.

A sliding door is used as the air mix door 40. The air mix door 40 is supported by a guide groove 60 that is provided in an inner wall surface of the air conditioning case 10, and moves along the guide groove 60. The guide groove 60 extends in an arc shape such that a leeward side thereof is projected. Accordingly, the air mix door 40 is also curved such that a leeward side thereof is projected. The air mix door 40 is provided with a driven gear 43 in a manner to mesh with a circular drive gear 70 that is supported by the air conditioning case 10. The drive gear 70 has a drive shaft 71 that extends in a door width direction. Both ends of the drive shaft 71 are rotatably supported by bearing holes that are provided in the air conditioning case 10 and are not depicted. The drive shaft 71 is rotated by a door driving device such as a servomotor, which is not depicted. The air mix door 40 moves by rotation of the drive gear 70. A detailed description on the air mix door 40 and the guide groove 60 will be made below.

The mode doors 51, 52, 53 switch a blowoff mode for blowing air-conditioned wind from a specified blowoff port toward the inside of the vehicle cabin by selectively opening or closing the openings 11, 12, 13, respectively. In this embodiment, a cantilever door is used as each of the mode doors 51, 52, 53.

Figure 2:
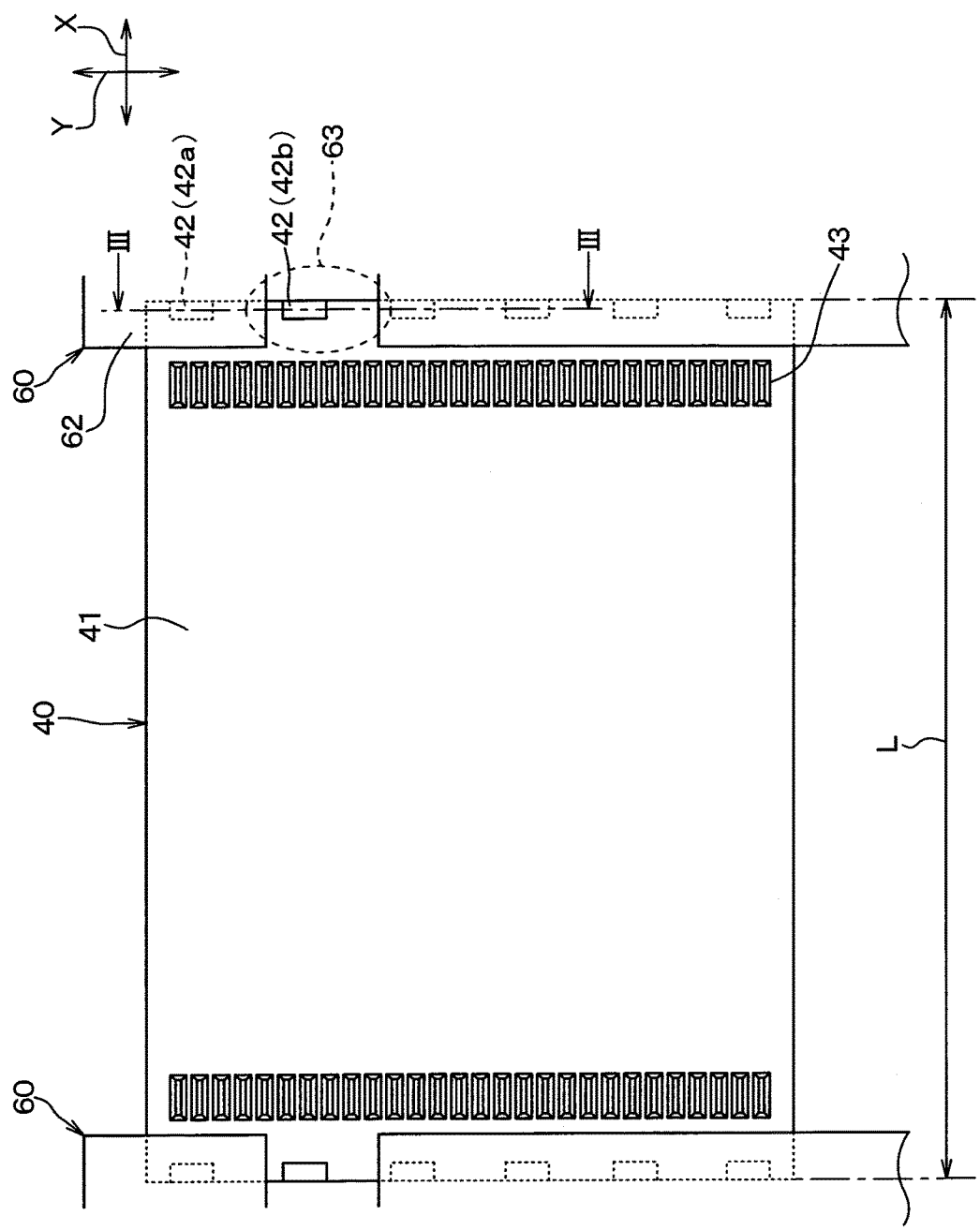
FIG. 2 is a front view of an air mix door when the air mix door in FIG. 1 is seen from an upstream side in a flow of air.
Figure 3:
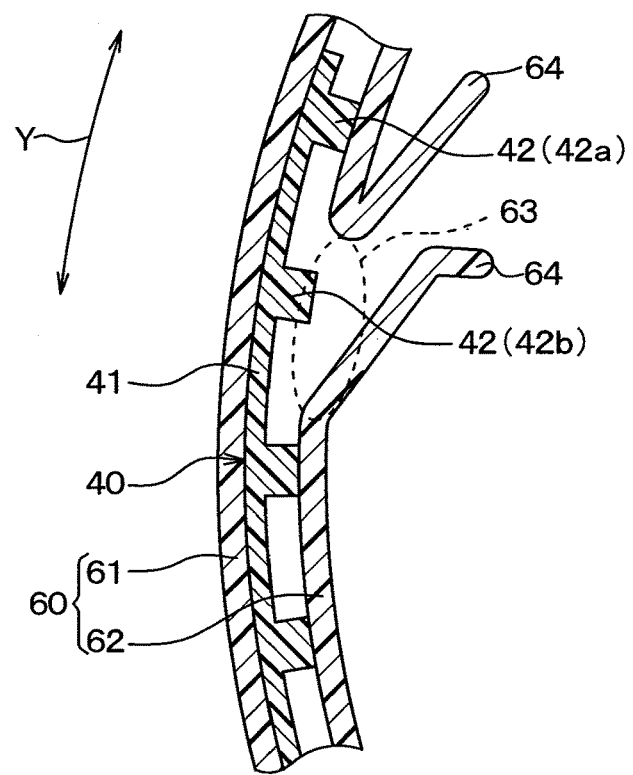
FIG. 3 is a cross-sectional view taken along a line III-Ill in FIG. 2.

Next, a description will be made on the air mix door 40 and the guide groove by using FIGS. 2 and 3. FIG. 2 is a view of the air mix door 40 in a state of being supported by the guide groove 60 in FIG. 1 that is seen from the upstream side in the flow of air. In FIG. 2, a guide section 64 in FIG. 3 is not depicted. It should be noted that a cross section of the air mix door 40 along a line passing through the driven gear 43 in FIG. 2 is depicted in FIG. 1. A cross section of the air mix door 40 along a line passing through a door support section 42 in FIG. 2 is depicted in FIG. 3.

As depicted in FIGS. 2 and 3, the air mix door 40 has a door main body 41, the door support section 42, and the driven gear 43.

The door main body 41 has a plate shape that is thinner than a groove width of the guide groove 60, and a planar shape thereof is a square. The door main body 41 is formed of a resin material with elasticity. The resin material may be PP, POM, PBT, ABS, and the like.

The door support section 42 is a portion that comes in contact with an inner wall of the guide groove 60 and is thereby supported by the guide groove 60, and multiple door support sections 42 are provided along a door moving direction Y at ends of the door main body 41 in the door width direction X. The door width direction X is a direction perpendicular to the door moving direction Y. The door support section 42 is projected from a surface on a windward side of the door main body 41. The door support section 42 is integrally molded of the same resin as that is used for the door main body 41, and is constructed of a thick section that is thicker than the door main body 41. The door support section 42 has a shape discontinuing in the door moving direction Y, but the multiple door support sections 42 are provided at intervals. In this way, the door main body 41 can be bent and deformed.

The driven gear 43 is arranged on an inner side in the door width direction of the door support section 42 at the end of the door main body 41 in the door width direction X. The driven gear 43 is provided to extend in parallel with the door moving direction Y on the surface on the windward side of the door main body 41. The driven gear 43 is integrally molded of the same resin as that is used for the door main body 41.

As a manufacturing method for the air mix door 40 with such a configuration, injection molding of a resin or a molding method that is equivalent thereto is adopted. However, the air mix door 40 may be manufactured by cutting the resin, or the like. In addition, the door support section 42 and the driven gear 43 may be integrated with the door main body 41 by adhesion after being molded as separate bodies from the door main body 41.

As depicted in FIGS. 2 and 3, the guide groove 60 supports the end of the air mix door 40 and guides movement of the air mix door 40. The guide groove 60 extends in the door moving direction Y. As depicted in FIG. 3, the guide groove 60 is constructed of two projection walls 61, 62 that are projected from the inner wall surface of the air conditioning case 10.

As depicted in FIGS. 1 to 3, the guide groove 60 has a groove lacking section 63 in which the guide groove 60 lacks a portion of a groove. The groove lacking section 63 has a shape that is formed by notching a portion of the projection wall 62. The groove lacking section 63 is provided in an intermediate portion of the guide groove 60 in the door moving direction. The groove lacking section 63 is in such size that the air mix door 40 can be inserted thereinto while being bent. The guide section 64 for guiding the air mix door 40 during insertion of the air mix door 40 continues with an opening end of the guide groove 60 that constitutes the groove lacking section 63. In this embodiment, the air mix door 40 is assembled to the guide groove 60 by bending and inserting the air mix door 40 from the groove lacking section 63 as depicted in an order of FIGS. 19A, 19B, 19C.

Figure 19A:
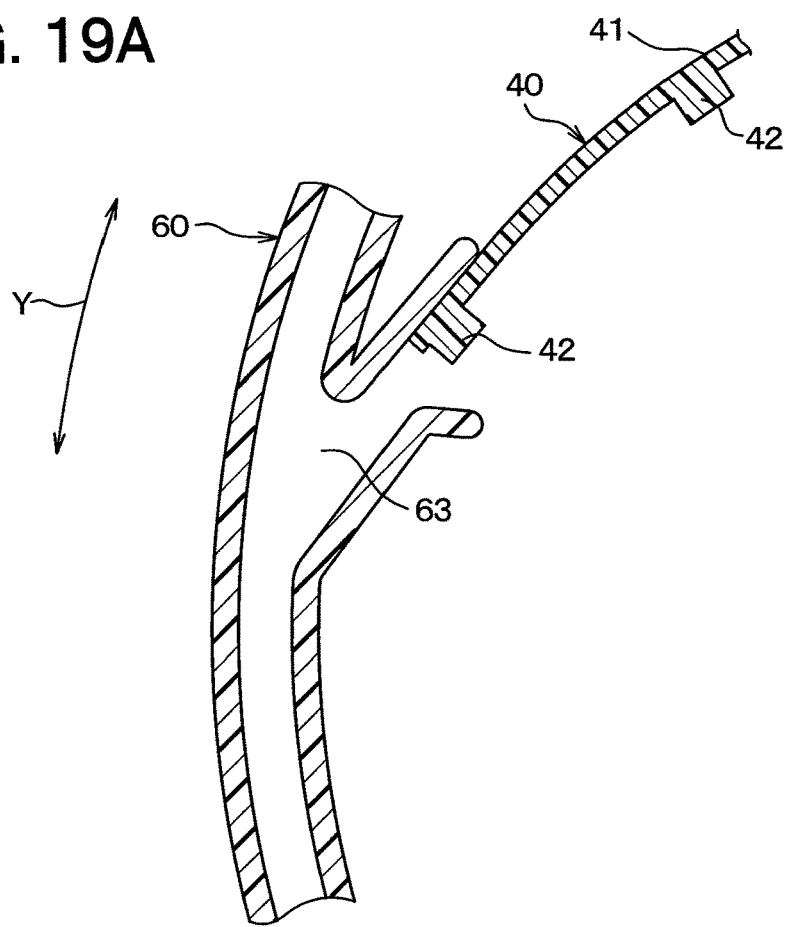
FIG. 19A is a cross-sectional view for explaining a process of assembling an air mix door of a comparative example to a guide groove.
Figure 19B:
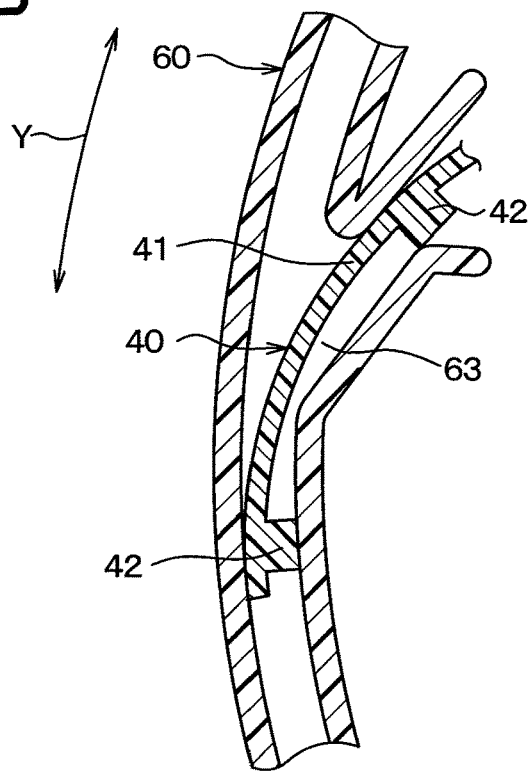
FIG. 19B is a cross-sectional view for explaining a process of assembling the air mix door of the comparative example to the guide groove.
Figure 19C:
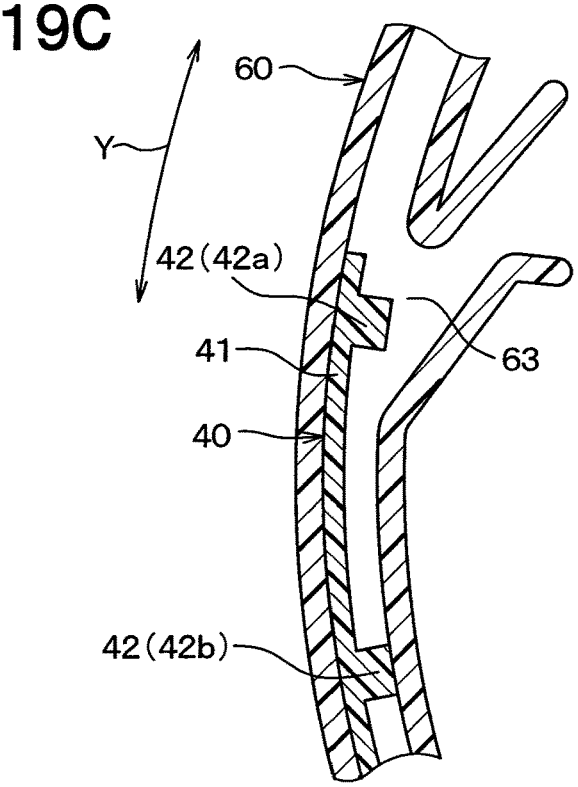
FIG. 19C is a cross-sectional view for explaining a process of assembling the air mix door of the comparative example to the guide groove.
Figure 20:
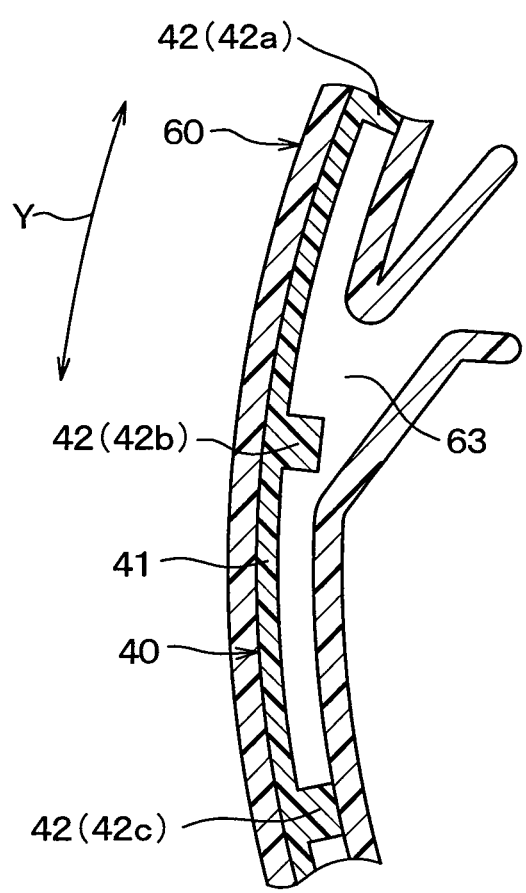
FIG. 20 is a cross-sectional view for explaining a process of assembling the air mix door of the comparative example to the guide groove.

In FIGS. 19A, 19B and 19C, an insertion opening is provided in the intermediate portion of the guide groove 60 in the door moving direction in the air conditioner case. As depicted in FIG. 20, being intermediate in the door moving direction means being within a moving range of the door 40. As depicted in the order of FIGS. 19A, 19B and 19C, the door 40 is inserted from the groove lacking section 63 while being bent. In this way, the door 40 is assembled to the guide groove 60. Since the groove lacking section 63 is located on an inner side of the air conditioner case, the groove lacking section does not have to be covered with a lid. According to what has just been described, a case dividing surface does not have to be formed in the vicinity of the door. Thus, such an issue that a layout of the air conditioner case is limited and that a flexibility in design of the air conditioner case is low can be solved.

The multiple door support sections 42 are provided at the ends of the door main body 41 in the door width direction. The multiple door support sections 42 are arranged from one end side to the other end side of the door main body 41 in the door moving direction at specified intervals.

Accordingly, depending on a position of the door 40, the door support section 42 is located at a position to oppose the groove lacking section 63. In this way, a state where the door support section 42 is not supported by the guide groove 60 occurs.

More specifically, as depicted in FIG. 19C, when a door support section 42a at the most distal end of the door, which is located on a tip side of the door main body 41 in the door moving direction, is located within the door lacking section 63, the door support section 42a at the tip of the door is brought into a state of being unsupported by the guide groove 60. If a vibration is input from the outside to the indoor unit due to a travel of the vehicle on an unpaved road or a stone paved road, or the like in this state, continuous hitting sound, which is generated when a tip side portion of the door main body 41 resonates and hits the air conditioner case, that is, abnormal rattling sound is generated. It should be noted that FIG. 19C depicts a case where only the first door support section 42a from the tip side of the door is located within the groove lacking section 63. However, a case where the abnormal rattling sound is generated is not limited to this case. A similar event occurs in a case where the interval between the door support sections 42 is narrower than that in the case of FIG. 19C and the multiple door support sections 42, which are continuously aligned from the tip side of the door, are located within the groove lacking section 63.

In addition, as depicted in FIG. 20, door support sections 42a, 42c are respectively located in portions of the guide groove 60 that are on both sides of the groove lacking section 63 to hold the groove lacking section 63 therebetween in the door moving direction, and a door support section 42b is located within the groove lacking section 63. Also in this case, the door support section 42 that is located within the groove lacking section 63 is not supported by the guide groove 60. Also in this state, the abnormal rattling sound is generated when the vibration is input from the outside to the indoor unit. It should be noted that a state where the one door support section 42 is located within the groove lacking section 63 is depicted in FIG. 20. However, the similar event occurs in a state where the multiple door support sections 42 are located within the groove lacking section 63.

As a measure against these events, it is considered to provide the groove lacking section 63 in the guide groove 60 that is on the outside of the moving range of the door 40. However, in this case, the door 40 is not located in a range where the groove lacking section 63 is provided in the guide groove 60 when the door is actuated. Thus, the range becomes a useless space.

Compared to the above comparative example, the door support section 42 is arranged to satisfy the following relational expression in this embodiment.

Figure 4:
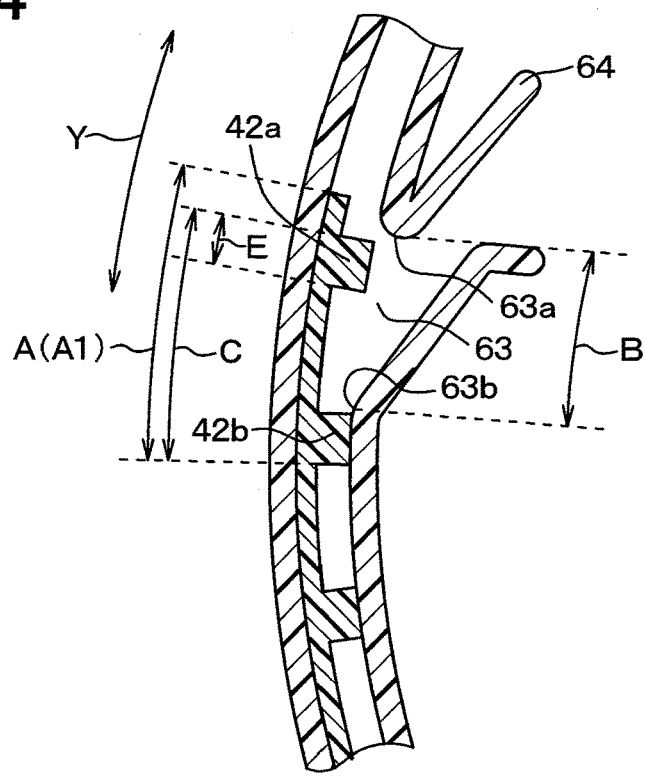
FIG. 4 is a cross-sectional view of the air mix door and a guide groove in the first embodiment.

As depicted in FIG. 4, a distance between contact ends of the two adjacent door support sections 42 in the door moving direction Y on separated sides from each other is set as C (unit: mm). The contact end referred here means an end of a portion of the door support section 42 that is in contact with the inner wall of the guide groove 60. In addition, a length of the groove lacking section 63 in the door moving direction Y is set as B (unit: mm). The length of the groove lacking section 63 means a distance between an upper opening end 63a and a lower opening end 63b of the guide section 60, which constitute the groove lacking section 63, along the door moving direction Y.

At this time, the first and second door support sections 42a, 42b from the tip side of the door are arranged to satisfy the following mathematical expression 1.

$$C \geq B \qquad \text{(Mathematical expression 1)}$$

In this way, when the first door support section 42a is located within the groove lacking section 63, the first and second door support sections 42a, 42b have such a relationship that the second door support section 42b is located on a side that is farther separated from the tip of the door than the groove lacking section 63 in the guide groove 60. When the first door support section 42a is located within the groove lacking section 63, an entire range of a contact portion of the door support section 42a that comes in contact with the guide groove 60 is located within the groove lacking section 63 and thus the door support section 42a is not supported by the guide groove 60. When the second door support section 42b is located on the side that is farther separated from the tip of the door than the groove lacking section 63 in the guide groove 60, at least a portion of a contact portion of the second door support section 42b that comes in contact with the guide groove 60 is located within the guide groove 60 and thus the door support section 42b is supported by the guide groove 60.

Furthermore, when a distance from the tip of the door of the door main body 41 to a contact end of the second door support section 42b on a separated side from the tip of the door is set as A1, the second door support section 42b is arranged so as to satisfy the following mathematical expression 2.

$$A1 \leq (90 - 0.2L) \qquad \text{(Mathematical expression 2)}$$

Figure 5:
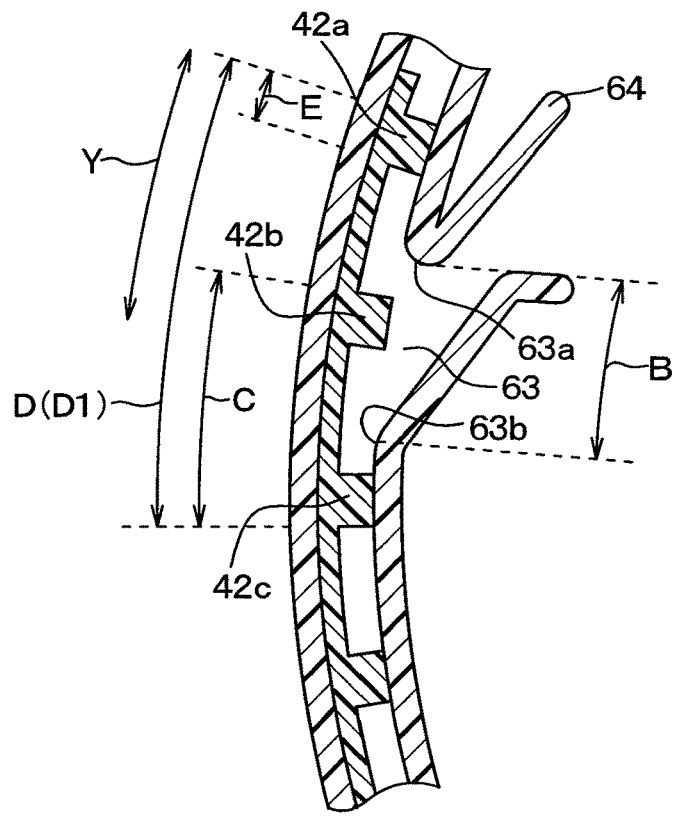
FIG. 5 is a cross-sectional view of the air mix door and the guide groove in the first embodiment.

In addition, the third and onward door support sections 42 from the tip of the door are arranged as follows. For example, as depicted in FIG. 5, the third door support section 42c from the tip of the door is arranged such that the distance C thereof from the second door support section 42b satisfies the above mathematical expression 1. In this way, such a relationship is established that the first and third door support sections 42a, 42c are respectively located in portions of the guide groove 60 on both sides that are one side (an upper side) in the door moving direction and the other side (a lower side) in the door moving direction of the groove lacking section 63 when the second door support section 42b from the tip of the door is located within the groove lacking section 63. When the door support section 42 is located within the groove lacking section 63, just as described, the one door support section 42 exists in the groove lacking section 63.

In addition, when a distance between contact ends of two of the first and third door support sections 42a, 42c on separated sides from each other is set as D1, the two door support sections 42a, 42c are arranged so as to satisfy the following mathematical expression 3.

$$D1 \leq 2(90 - 0.2L) \qquad \text{(Mathematical expression 3)}$$

Figure 6:
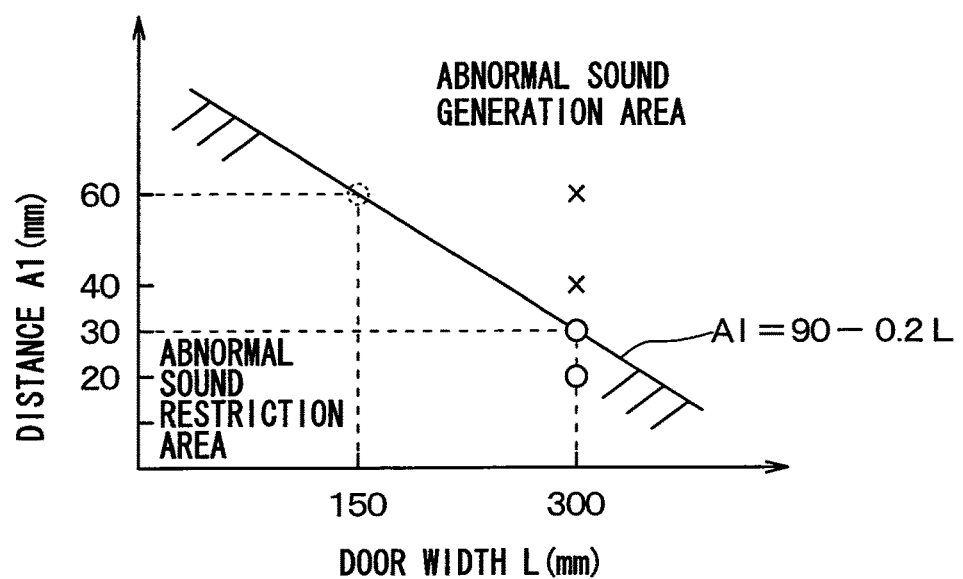
FIG. 6 is a graph illustrating a relationship among a distance between two door support sections, a door width, and a presence or absence of abnormal rattling sound.

The above-described mathematical expression 2 is derived from a result of an evaluation test conducted by the inventor. In the evaluation test, the air mix doors 40 in which the above-described distance A1 is set in various measurements are prepared. The vibrations are applied to the air conditioning case 10, to which each of the air mix doors 40 is mounted, by a vibration testing machine, so as to evaluate presence or absence of the generation of the abnormal rattling sound. In this test, as depicted in FIG. 4, the position of the air mix door 40 is set to such a position that the first door support section 42a from the tip of the door exists within the groove lacking section 63. As test conditions of the vibration testing machine, oscillation vibration is set at 1 G, and a resonance frequency is changed in a range of 0 to 100 Hz. The evaluation is made on the basis of whether the abnormal rattling sound is heard. The result is depicted in FIG. 6. A circle in FIG. 6 indicates that the abnormal rattling sound is restricted, and x in FIG. 6 indicates that the abnormal rattling sound is generated.

As depicted in FIG. 6, in the case where a door width L was 300 mm, the abnormal rattling sound is restricted when the distance A1 is 20 mm, and the abnormal rattling sound is restricted when the distance A1 is 30 mm. The abnormal rattling sound is generated when the distance A1 is 40 mm, and the abnormal rattling sound is generated when the distance A1 is 60 mm. From what has just been described, it is understood that the generation of the abnormal rattling sound can be restricted by setting the distance A1 to be 30 mm or shorter.

In addition, in a case where the door width L is 150 mm, which is a half of 300 mm, it is estimated that the generation of the abnormal rattling sound can be restricted by setting the distance A1 to be 60 mm or shorter, due to the following reason. In the case where the door width L is reduced to a half while a door length of the air mix door 40 remains the same, a weight of the door is reduced to a half. In the case where a weight of the portion on the tip side of the door that has to be supported by the second door support section 42b is reduced to the half when the first door support section 42a is located within the groove lacking section 63, it is estimated that the distance A1, for which the vibration can be restricted, becomes twice the length.

Accordingly, as depicted in FIG. 6, it is estimated that the generation of the abnormal rattling sound can be restricted on a straight line (A1=90−0.2L) that passes through two points of (A1, L)=(30, 300), (A1, L)=(60, 150) and a region on a lower side of the straight line.

In addition, the above-described mathematical expression 3 is derived from the mathematical expression 2 as described below.

The above-described mathematical expression 2 is derived from the result of the test when the position of the air mix door 40 is in a door position in the state depicted in FIG. 4. In this door position, the second door support section 42b is in a state of supporting a portion of the door main body 41 that is on the tip side (the upper side in the drawing) of the second door support section 42b. Accordingly, the mathematical expression 2 defines a maximum length of a door supported portion that can be supported by the one door support section within a range where the generation of the abnormal rattling sound can be restricted.

Meanwhile, when the position of the air mix door 40 is in a door position in the state depicted in FIG. 5, two of the first and third door support sections 42a, 42c are in a state of supporting the door supported portion of the door main body 41 between the first door support section 42a and the third door support section 42c. Accordingly, it is estimated that a maximum weight of the door supported portion that can be supported by the two door support sections within the range where the generation of the abnormal rattling sound can be restricted becomes twice a maximum weight at a time that the door supported portion is supported by the one door support section 42. In this way, it is estimated that the generation of the abnormal rattling sound can be restricted by setting the distance D1 to be twice a right side of the mathematical expression 2 or shorter.

In this embodiment, as depicted in FIG. 2, lengths E of the door support sections 42 in the door moving direction are all set the same, and the multiple door support sections 42 are arranged equally. In addition, when it is set, for example, that L=300 mm, B=25 mm, and E=3 mm, the distance C, the distance A1, and the distance D1 are set as follows: C=28 mm, A1=30 mm, and D1=53 mm. At this time, the above mathematical expressions 2, 3 are satisfied.

Accordingly, in this embodiment, the second door support section 42b from the tip side of the door is arranged in a manner to satisfy the above-described mathematical expression 2. Thus, the generation of the abnormal rattling sound can be restricted at a time that the first door support section 42a from the tip side of the door is located within the groove lacking section 63.

In addition, in this embodiment, the first and third door support sections 42a, 42c from the tip side of the door are arranged in a manner to satisfy the above-described mathematical expression 3. Thus, the generation of the abnormal rattling sound can be restricted at a time that the second door support section 42b is located within the groove lacking section 63. It should be noted that a similar effect can be obtained by arranging the fourth and onward door support sections 42 from the tip side of the door in a similar manner to the third door support section 42c.

Second Embodiment

In the first embodiment, the case where the one door support section 42 is located within the groove lacking section 63 is described. In this embodiment, a case where two door support sections 42 are located within a groove lacking section 63 will be described.

Figure 7:
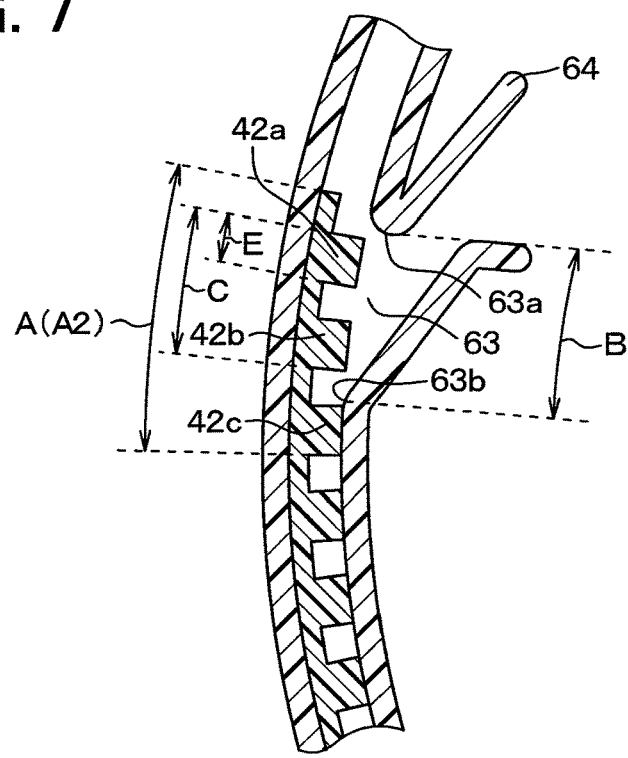
FIG. 7 is a cross-sectional view of an air mix door and a guide groove in a second embodiment.
Figure 8:
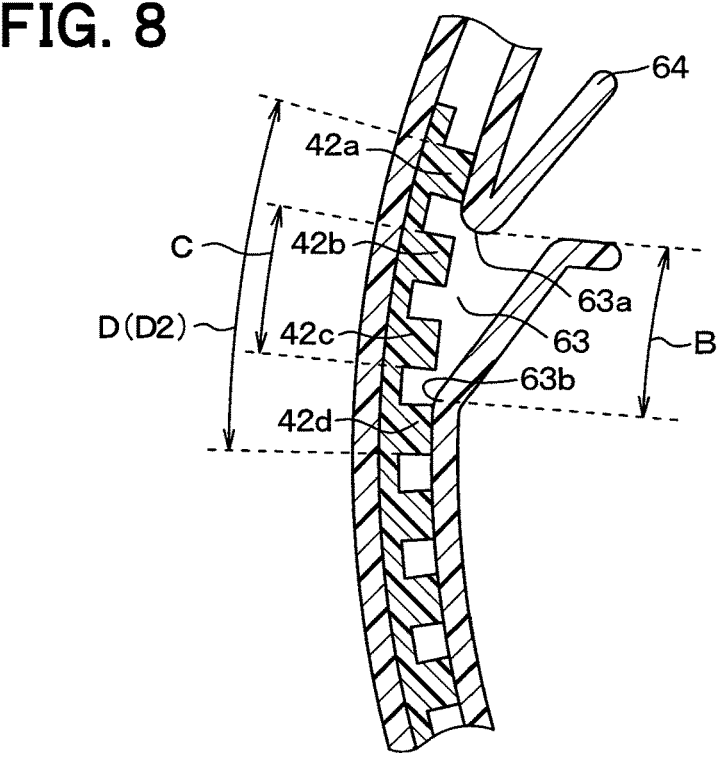
FIG. 8 is a cross-sectional view of the air mix door and the guide groove in the second embodiment.

Also, in this embodiment, lengths E of the door support sections 42 are all the same, and all of the plural door support sections 42 are arranged at the equal intervals. In addition, in this embodiment, as depicted in FIGS. 7 and 8, a distance C between the two adjacent door support sections 42 is set to be shorter than a length B of the groove lacking section 63 (C<B). Furthermore, the plural door support sections 42 are arranged such that the two door support sections 42 exist within the groove lacking section 63 when the door support sections 42 are located within the groove lacking section 63.

More specifically, as depicted in FIG. 7, three door support sections 42a, 42b, 42c are arranged such that the third door support section 42c is located on a side distant from the tip side of the door (the lower side in the drawing) than the groove lacking section 63 in a guide groove 60 that is separated from the tip of the door when the first and second door support sections 42a, 42b from the tip side of the door are located within the groove lacking section 63. In addition, when a distance from the tip of the door to a contact end of the third door support section 42c on a separated side from the tip of the door is set as A2, the third door support section 42c is arranged so as to satisfy the following mathematical expression 4.

$$A2 \leq 90 - 0.2L \quad \text{(Mathematical expression 4)}$$

In this mathematical expression 4, the distance A1 in the above-described mathematical expression 2 is replaced with the distance A2. In the first embodiment, the second door support section 42b serves as a supporting point for supporting a tip side portion of a door main body 41 when the entire first door support section 42a is located within the groove lacking section 63. On the contrary, in this embodiment, the third door support section 42c serves as the supporting point. Accordingly, it is estimated that the similar effect to that in the first embodiment can be obtained by satisfying the mathematical expression 4 in which the distance A1 in the mathematical expression 2 is replaced with the distance A2.

In addition, as depicted in FIG. 8, four door support sections 42a to 42d are arranged such that the first and fourth door support sections 42a, 42d are respectively located in the portions of the guide groove 60 on both sides that are the one side in the door moving direction and the other side in the door moving direction of the groove lacking section 63 when the second and third door support sections 42b, 42c from the tip side of the door are located within the groove lacking section 63. When a distance between the contact ends of the first and fourth door support sections 42a, 42d on the separated sides from each other is set as D2, the fourth door support section 42d is arranged so as to satisfy the following mathematical expression 5.

$$D2 \leq 2(90 - 0.2L) \quad \text{(Mathematical expression 5)}$$

In this mathematical expression 5, the distance D1 in the above-described mathematical expression 3 is replaced with the distance D2. In the first embodiment, the first and third door support sections 42a, 42c serve as the supporting points for supporting the door main body 41. Meanwhile, in this embodiment, the first and fourth door support sections 42a, 42d serve as the supporting points for supporting the door main body 41. Accordingly, it is estimated that the similar effect to that in the first embodiment can be obtained by satisfying the mathematical expression 5 in which the distance D1 in the mathematical expression 3 is replaced with the distance D2.

It should be noted that a similar effect can be obtained by arranging the fifth and onward door support sections 42 from the tip side of the door in a similar manner to the fourth door support section 42d.

Third Embodiment

In this embodiment, the shape of a door support section 42 is changed from those in the first and second embodiments. The rest of the configuration is the same as those in the first and second embodiments.

Figure 9:
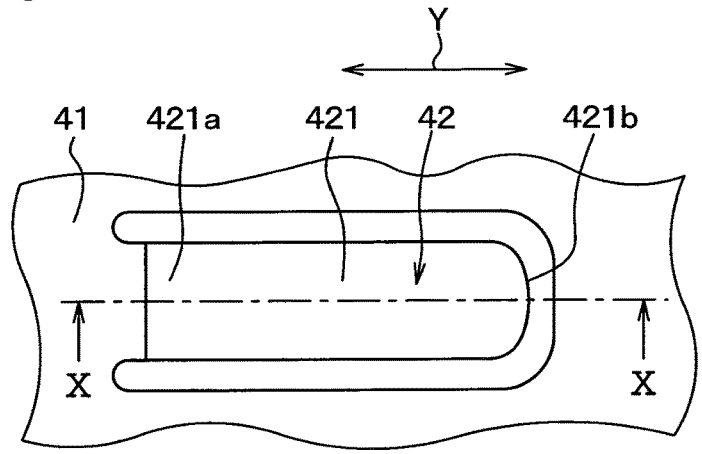
FIG. 9 is a top view of a door support section in a third embodiment.
Figure 10:
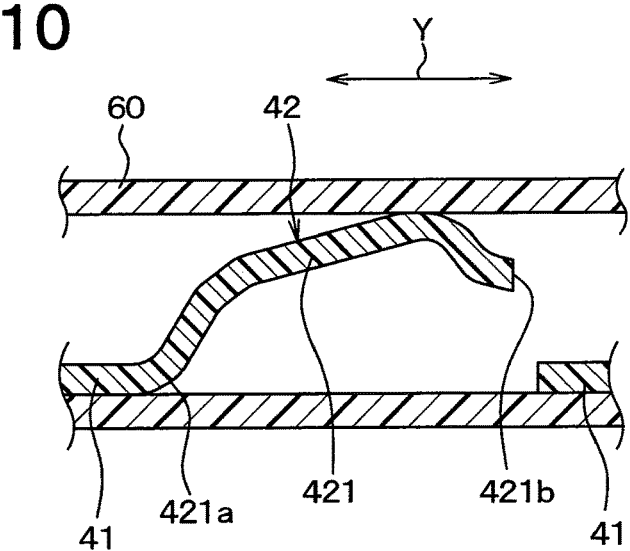
FIG. 10 is a cross-sectional view taken along a line X-X in FIG. 9.

As depicted in FIGS. 9 and 10, the door support section 42 in this embodiment has such a shape that a plate piece 421 is projected from a door main body 41, and has a shape of a cantilever plate spring in which one end 421a of the plate piece 421 in the door moving direction is fixed and the other end 421b in the door moving direction is free. In addition, an air mix door 40 is inserted in a guide groove 60 in a state where the door support section 42 is elastically deformed. Accordingly, in this embodiment, the air mix door 40 is rigidly supported by the guide groove 60 by an elastic force (a restoring force) of the door support section 42.

According to this embodiment, the door main body 41 is rigidly supported by the spring shape of the door support section 42 when a door support section 42a at the tip of the door is located within a groove lacking section 63. Thus, compared to the first and second embodiments, the generation of the abnormal rattling sound can further be restricted.

Fourth Embodiment

Figure 11:
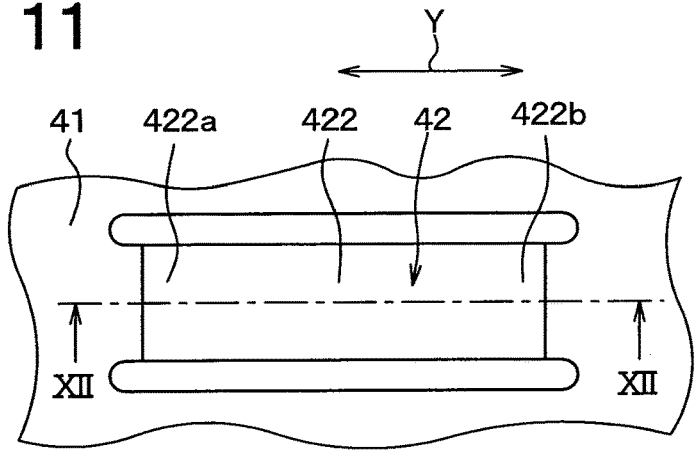
FIG. 11 is a top view of a door support section in a fourth embodiment.
Figure 12:
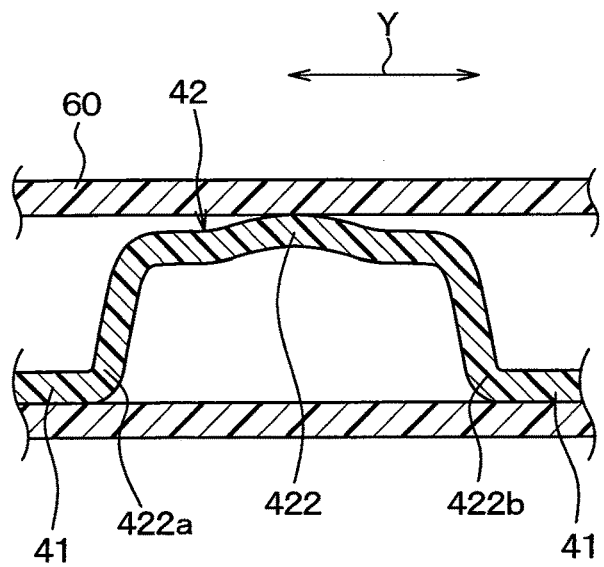
FIG. 12 is a cross-sectional view taken along a line XII-XII in FIG. 11.

As depicted in FIGS. 11 and 12, a door support section 42 in this embodiment has such a shape that a plate piece 422 is projected from a door main body 41, and has a shape of a plate spring, both ends of which are supported, and in which both ends 422a, 422b of the plate piece 422 in the door moving direction are fixed. It should be noted that the rest of the configuration is the same as those in the first and second embodiments. Also, in this embodiment, the door support section 42 has the spring shape. Thus, the similar effect as that in the third embodiment can be exerted.

Fifth Embodiment

Figure 13:
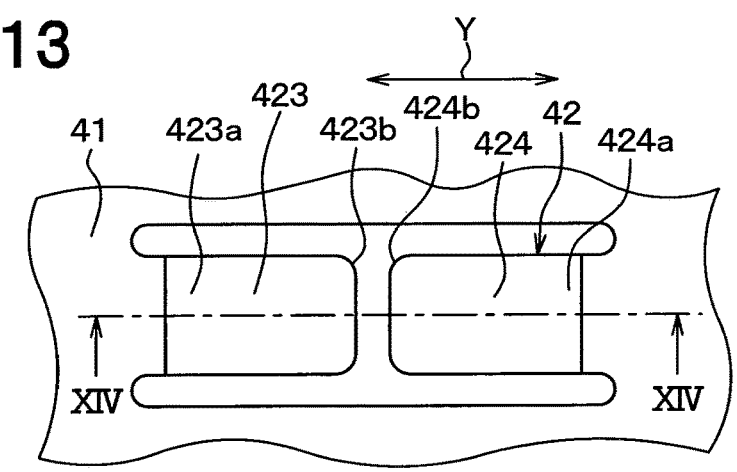
FIG. 13 is a top view of a door support section in a fifth embodiment.
Figure 14:
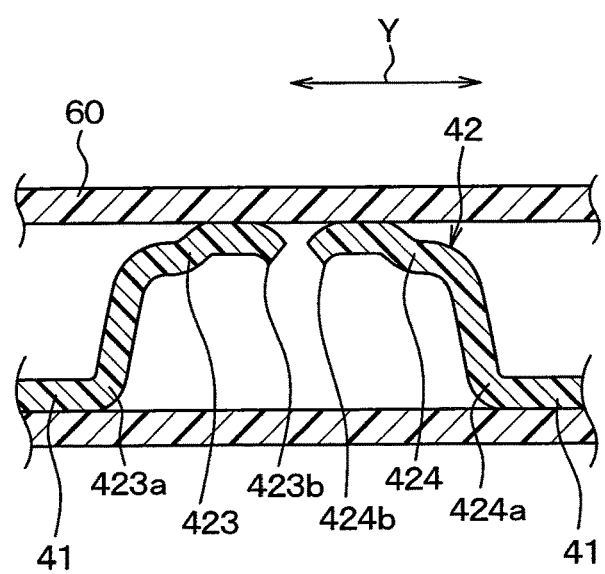
FIG. 14 is a cross-sectional view taken along a line XIV-XIV in FIG. 13.

As depicted in FIGS. 13 and 14, a door support section 42 in this embodiment has such a shape that two cantilever plate springs are aligned in the door moving direction. In the cantilever plate springs, plate pieces 423, 424 are respectively projected from a door main body 41. One ends 423a, 424a of the plate pieces 423, 424, each of which is located on an outer side of the door support section 42, are fixed, and the other ends 423b, 424b of the plate pieces 423, 424, each of which is located at a center of the door support section 42, are free. It should be noted that the rest of the configuration is the same as those in the first and second embodiments. Also, in this embodiment, the door support section 42 has the spring shape. Thus, the similar effect as that in the third embodiment can be exerted.

Sixth Embodiment

Figure 15:
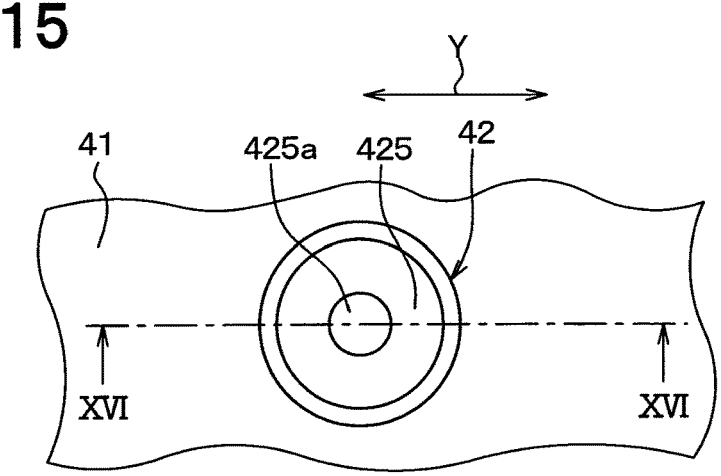
FIG. 15 is a top view of a door support section in a sixth embodiment.
Figure 16:
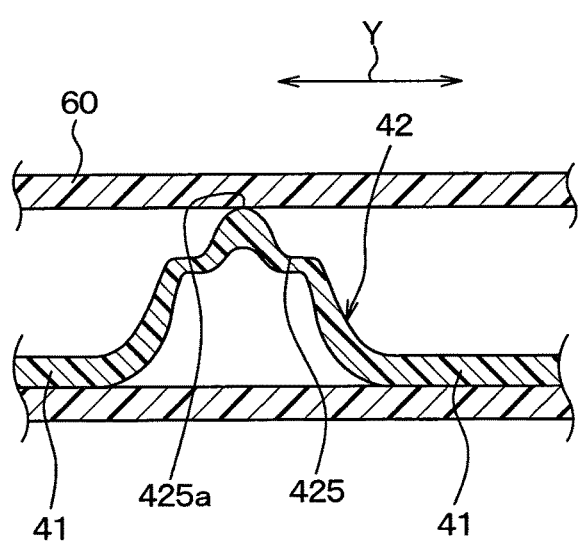
FIG. 16 is a cross-sectional view taken along a line XVI-XVI in FIG. 15.

As depicted in FIGS. 15 and 16, a door support section 42 in this embodiment is projected from a door main body 41 in a cylindrical shape that has side walls and a cylindrical upper surface 425, and further has such a shape that a central section 425a of the cylindrical upper surface 425 is projected. Since the cylindrical upper surface 425 is elastically deformed, the door support section 42 has the spring shape. It should be noted that the rest of the configuration is the same as those in the first and second embodiments. Also, in this embodiment, the door support section 42 has the spring shape. Thus, the similar effect as that in the third embodiment can be exerted.

Seventh Embodiment

Figure 17:
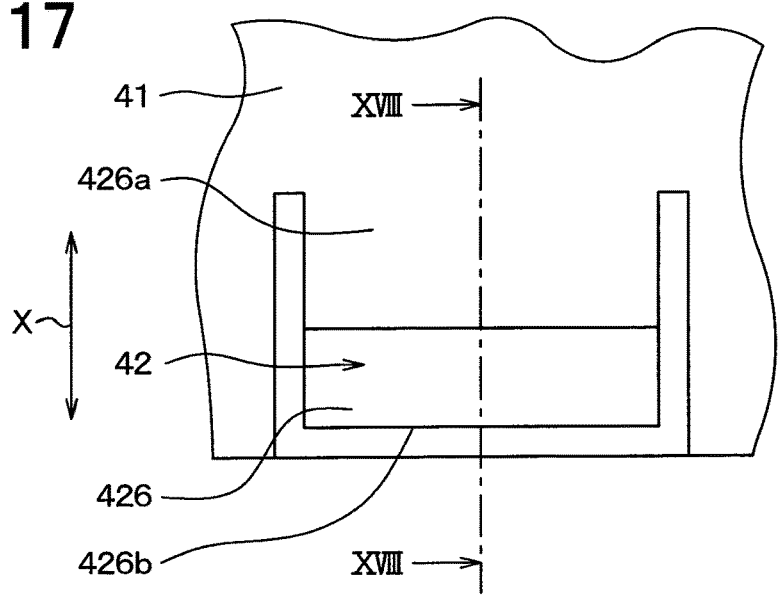
FIG. 17 is a top view of a door support section in a seventh embodiment.
Figure 18:
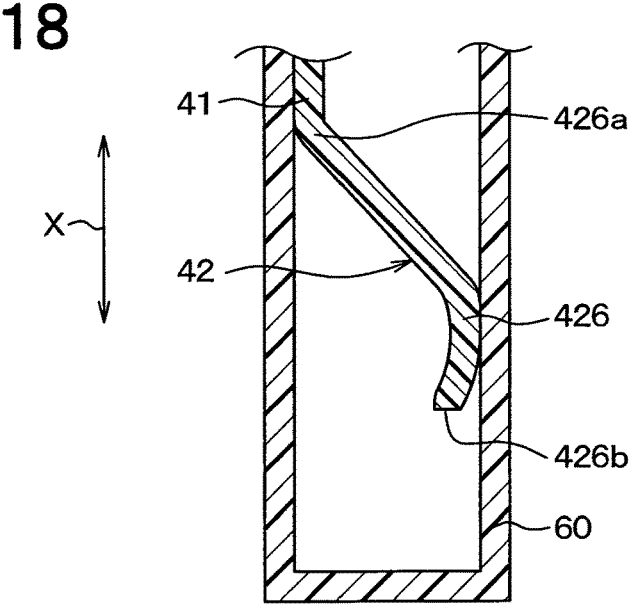
FIG. 18 is a cross-sectional view taken along a line XVIII-XVIII in FIG. 17.

As depicted in FIGS. 17 and 18, a door support section 42 in this embodiment has such a shape that a plate piece 426 is projected from a door main body 41, and has a shape of a cantilever plate spring in which an end 426a of the plate piece 426 on the inner side of the door in a door width direction X is fixed and an end 426b of the plate piece 426 on the outer side of the door is free. It should be noted that the rest of the configuration is the same as those in the first and second embodiments. Also, in this embodiment, the door support section 42 has the spring shape. Thus, the similar effect as that in the third embodiment can be exerted.

Other Embodiments

The present disclosure is not limited to the above-described embodiments and can appropriately be modified as below within a scope described in the claims.

In the second embodiment, the case where the two door support sections 42 are located within the groove lacking section 63 is described. However, the positions of the door support sections 42 may be set in a similar manner also in the case where the three or more door support sections 42 are located within the groove lacking section 63.

That is, when the door support sections 42 including the first door support section 42a from the tip side of the door are located within the groove lacking section 63, of the door support sections 42 located in the portion on the side that are farther separated from the tip of the door than the groove lacking section 63 of the guide groove 60, the door support section 42 that is the closest to the groove lacking section 63 may be arranged to satisfy the following first relational expression.

$$A \leq 90 - 0.2L$$

Here, A in the expression corresponds to A1 and A2 in the above-described mathematical expressions 2 and 4, and indicates a distance from the tip of the door of the door main body 41 to the end of the door support section 42 on the side that is separated from the tip of the door. In the expression, L indicates the door width of the door main body 41. The units of A and L are mm.

In addition, when the door support sections 42 are located in the portions on both of the sides that are the one side in the door moving direction and the other side in the door moving direction of the groove lacking section 63 of the guide groove 60, and when the door support section 42 is located within the groove lacking section 63, in the portions on the one side and the other side of the groove lacking section 63, the two door support sections 42 that are the closest to the groove lacking section 63 may be arranged to satisfy the following second relational expression.

$$D \leq 2(90 - 0.2L)$$

Here, D in the expression corresponds to D1 and D2 in the above-described mathematical expressions 3 and 5, and indicates the distance between the ends on the separated sides from each other of the two door support sections. In the expression, L indicates the door width of the door main body 41. The units of D and L are mm.

In each of the above-described embodiments, the distance D between the two adjacent door support sections 42 and the length E of the door support section 42 are uniform among all of the door support sections 42. However, these dimensions may differ between the portion of the door main body 41 on the tip side of the door and the portion thereof on the separated side from the tip of the door.

In each of the above-described embodiments, the arrangement of the door support sections 42 is defined to satisfy both of the first relational expression and the second relational expression, but may be defined to satisfy at least one thereof. In this way, the generation of the abnormal rattling sound in at least one of the case where the door support section on the tip side of the door is located within the groove lacking section and the case where the door support sections are located in the portions on both of the sides of the groove lacking section in the guide groove and the door support section is located within the groove lacking section.

In each of the above-described embodiments, a case where an upper end side of the door is the tip side of the door is described. However, even in the case where a lower end side of the door is the tip side of the door, the door support sections may be arranged in a similar manner to each of the above-described embodiments.

In each of the above-described embodiments, the sliding door of the present disclosure is applied to the air mix door 40 but may be applied to the mode doors 51, 52, 53.

In each of the above-described embodiments, the guide groove 60 is constructed of the two projection walls 61, 62, but may be constructed of one projection wall and a case end of the air conditioning case 10 that serves as an opposing wall opposing the projection wall. Also, in this case, the groove lacking section 63 is formed in the projection wall.

In addition, the guide groove 60 may be constructed of a recessed section that is provided in the inner wall surface of the air conditioner case, instead of the projection wall. In this case, the groove lacking section is also constructed of the recessed section that is provided in the inner wall surface of the air conditioner case. For example, the recessed section that constitutes the groove lacking section is provided in a manner to continue with the dividing surface of the air conditioner case, and the sliding door is inserted from the divided surface.

In each of the above-described embodiments, the air mix door 40 is supported by the guide groove 60 in such a state that the entirety thereof is bent and deformed. However, the air mix door 40 may be supported in a flat shape by the guide groove 60. In this case, as in the third to seventh embodiments, the door support section 42 preferably has the spring shape in order to support the air mix door 40.

In each of the above-described embodiments, the air mix door 40 is constructed of the resin but may be constructed of a material other than the resin like a metallic material, wood, or the like, for example. Meanwhile, the door main body 41 has to be constructed of a material that can be elastically deformed in order to bend and insert the air mix door 40 from the groove lacking section 63.

In each of the above-described embodiments, the groove lacking section 63 is formed in the guide groove 60 for a purpose of the assembly of the air mix door 40. However, the groove lacking section 63 may be formed due to a manufacturing limitation on the air conditioner case, for a purpose of a foreign object discharging port, or the like, for example. That is, the groove lacking section in such size that the door main body can be inserted therefrom only has to be formed in the guide groove.

In each of the above-described embodiments, the air conditioner of the present disclosure is applied to the vehicular air conditioner that is mounted in the vehicle, but may be applied to an air conditioner that is installed in a building or the like.

The embodiments above are not irrelevant to one another and can be combined appropriately unless a combination is obviously impossible. In the respective embodiments above, it goes without saying that elements forming the embodiments are not necessarily essential unless specified as being essential or deemed as being apparently essential in principle.

The invention claimed is:

1. An air conditioning device comprising:
   an air conditioning case that has an opening through which air passes;
   a sliding door arranged in the air conditioning case to control an opening area of the opening; and
   a guide groove provided in an inner wall surface of the air conditioning case to support an end of the sliding door and to guide a movement of the sliding door, wherein the sliding door has:
   a door main body in a planar shape that is thinner than a groove width of the guide groove; and
   a plurality of door support sections provided along a door moving direction at an end of the door main body in a door width direction, the plurality of door support sections being supported by the guide groove by contact with an inner wall of the guide groove,
   the guide groove has a groove lacking section in an intermediate portion in the door moving direction, the groove lacking section being in such a size that the door main body can be inserted therefrom,
   when a first one of the door support sections that is the closest to a tip end of the sliding door in the door moving direction is located within the groove lacking section, another one of the door support sections that is located opposite from the tip end of the sliding door through the groove lacking section in the guide groove and that is the closest to the groove lacking section satisfies a relational expression of A≤90−0.2L, wherein A (unit: mm) represents a distance from the tip end of the sliding door to an end of the another one of the door support sections, which is the closest to the groove lacking section, on a separated side away from the tip end, and L (unit: mm) represents a door width of the door main body,
   when the first one of the plurality of door support sections is located within the groove lacking section, an entire range of a contact portion of the first door support section that comes in contact with the guide groove is located within the groove lacking section such that the first door support section is not supported by the guide groove, and
   when the another one of the plurality of door support sections is located on the side that is farther separated from the tip of the door than the groove lacking section in the guide groove, at least a portion of a contact portion of the another one of the door support sections that comes in contact with the guide groove is located within the guide groove such that the another one of the door support sections is supported by the guide groove.

2. The air conditioning device according to claim 1, wherein
   the relational expression is set as a first relational expression, and
   a second relational expression of D≤2(90−0.2L) is further satisfied, wherein D (unit: mm) represents a distance between ends on separated sides from each other of two of the door support sections located the closest to the groove lacking section on sides that are one side in the door moving direction and the other side in the door moving direction of the groove lacking section in the guide groove, when the another one of the door support sections is located within the groove lacking section, and L (unit: mm) represents the door width of the door main body.

3. The air conditioning device according to claim 1, wherein, when a distance between ends on separated sides from each other of two of the door support sections adjacent to each other in the door moving direction is defined as C (unit: mm), and when a length of the groove lacking section in the door moving direction is defined as B (unit: mm), the door support sections are arranged to satisfy C≥B.

4. The air conditioning device according to claim 1, wherein
   the guide groove includes a projection wall projected from the inner wall surface of the air conditioning case and an opposing wall that opposes the projection wall.

5. The air conditioning device according to claim 1, wherein the sliding door is supported by the guide groove in a state of being bent and deformed.

6. The air conditioning device according to claim 1, wherein
   the plurality of door support sections each demonstrating elastic properties, and
   the sliding door is supported by the guide groove with elastic forces of the door support sections.

7. The air conditioning device according to claim 1, wherein
the sliding door further includes a driven gear extending continuously along and parallel with the door moving direction, and located inward of the plurality of door support sections in the door width direction.

8. The air conditioning device according to claim 1, wherein
the groove lacking section is located in an upper portion of the guide groove in the door moving direction.

9. The air conditioning device according to claim 1, wherein
the groove lacking section is defined by an upper wall extending at an angle from the guide groove and a lower wall extending at an angle from the guide groove, the upper wall and the lower wall being parallel to each other.

10. An air conditioning device comprising:
an air conditioning case that has an opening through which air passes;
a sliding door arranged in the air conditioning case to control an opening area of the opening; and
a guide groove provided in an inner wall surface of the air conditioning case to support an end of the sliding door and to guide a movement of the sliding door, wherein the sliding door has:
  a door main body in a planar shape that is thinner than a groove width of the guide groove; and
  a plurality of door support sections provided along a door moving direction at an end of the door main body in a door width direction, the plurality of door support sections being supported by the guide groove by contact with an inner wall of the guide groove,
the guide groove has a groove lacking section in an intermediate portion in the door moving direction, the groove lacking section being in such a size that the door main body can be inserted therefrom,
a relational expression of $D \leq 2(90-0.2L)$ is satisfied, wherein D (unit: mm) represents a distance between ends on separated sides from each other of two of the door support sections located the closest to the groove lacking section on sides that are one side in the door moving direction and the other side in the door moving direction of the groove lacking section in the guide groove, when another one of the door support sections is located within the groove lacking section, and L (unit: mm) represents a door width of the door main body,
when a first one of the plurality of door support sections is located within the groove lacking section, an entire range of a contact portion of the first door support section that comes in contact with the guide groove is located within the groove lacking section such that the first door support section is not supported by the guide groove, and
when the another one of the plurality of door support sections is located on the side that is farther separated from a tip of the door than the groove lacking section in the guide groove, at least a portion of a contact portion of the another one of the door support sections that comes in contact with the guide groove is located within the guide groove such that the another one of the door support sections is supported by the guide groove.

11. The air conditioning device according to claim 10, wherein, when a distance between ends on separated sides from each other of two of the door support sections adjacent to each other in the door moving direction is defined as C (unit: mm), and when a length of the groove lacking section in the door moving direction is defined as B (unit: mm), the door support sections are arranged to satisfy $C \geq B$.

12. The air conditioning device according to claim 10, wherein
the guide groove includes a projection wall projected from the inner wall surface of the air conditioning case and an opposing wall that opposes the projection wall.

13. The air conditioning device according to claim 10, wherein the sliding door is supported by the guide groove in a state of being bent and deformed.

14. The air conditioning device according to claim 10, wherein
the plurality of door support sections each demonstrating elastic properties, and
the sliding door is supported by the guide groove with elastic forces of the door support sections.

15. The air conditioning device according to claim 10, wherein
the sliding door further includes a driven gear extending continuously along and parallel with the door moving direction, and located inward of the plurality of door support sections in the door width direction.

16. The air conditioning device according to claim 10, wherein
the groove lacking section is located in an upper portion of the guide groove in the door moving direction.

17. The air conditioning device according to claim 10, wherein
the groove lacking section is defined by an upper wall extending at an angle from the guide groove and a lower wall extending at an angle from the guide groove, the upper wall and the lower wall being parallel to each other.

* * * * *